US012046814B2

(12) United States Patent
Wakabayashi

(10) Patent No.: US 12,046,814 B2
(45) Date of Patent: Jul. 23, 2024

(54) ANTENNA UNIT AND COMMUNICATION EQUIPMENT

(71) Applicant: Sony Interactive Entertainment Inc., Tokyo (JP)

(72) Inventor: Minoru Wakabayashi, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 269 days.

(21) Appl. No.: 17/609,815

(22) PCT Filed: May 26, 2020

(86) PCT No.: PCT/JP2020/020711
§ 371 (c)(1),
(2) Date: Nov. 9, 2021

(87) PCT Pub. No.: WO2020/241631
PCT Pub. Date: Dec. 3, 2020

(65) Prior Publication Data

US 2022/0224004 A1 Jul. 14, 2022

(30) Foreign Application Priority Data

May 30, 2019 (JP) ................................ 2019-101376

(51) Int. Cl.
*H01Q 1/52* (2006.01)
*H01Q 13/10* (2006.01)

(52) U.S. Cl.
CPC ........... *H01Q 1/525* (2013.01); *H01Q 13/106* (2013.01)

(58) Field of Classification Search
CPC ........ H01Q 1/106; H01Q 1/241; H01Q 1/525; H01Q 1/2291
See application file for complete search history.

(56) References Cited

U.S. PATENT DOCUMENTS

2008/0258992 A1* 10/2008 Tsai ........................ H01Q 21/28 343/853
2014/0118215 A1* 5/2014 Hsu .......................... H01Q 9/42 343/853

(Continued)

FOREIGN PATENT DOCUMENTS

JP 2005072653 A 3/2005
JP 2005244317 A 9/2005

(Continued)

OTHER PUBLICATIONS

Decision to Grant a Patent for corresponding JP Application No. 2021-522781, 4 pages, dated May 23, 2022.

(Continued)

*Primary Examiner* — Jimmy T Vu
(74) *Attorney, Agent, or Firm* — Matthew B. Dernier, Esq.

(57) ABSTRACT

An antenna unit includes a first antenna portion and a second antenna portion that individually transmit or receive a wireless signal, and a ground portion electrically connected to the first antenna portion and the second antenna portion and including a portion positioned between the first antenna portion and the second antenna portion. A through-hole that resonates with a given frequency is provided at a position of the ground portion between the first antenna portion and the second antenna portion.

9 Claims, 5 Drawing Sheets

(56) References Cited

U.S. PATENT DOCUMENTS

| | | | |
|---|---|---|---|
| 2015/0084824 | A1 | 3/2015 | Montgomery |
| 2018/0351244 | A1 | 12/2018 | Mcauliffe |

FOREIGN PATENT DOCUMENTS

| | | | |
|---|---|---|---|
| WO | 2007119289 | A1 | 10/2007 |
| WO | 2018230039 | A1 | 12/2018 |

OTHER PUBLICATIONS

International Search Report for corresponding PCT Application No. PCT/JP2020/020711, 4 pages, dated Aug. 18, 2020.
Extended European Search Report for corresponding Application No. EP 20813714.1, 8 pages, dated Jan. 24, 2023.

* cited by examiner

ANTENNA UNIT AND COMMUNICATION EQUIPMENT

TECHNICAL FIELD

The present invention relates to an antenna unit that includes a plurality of antennae for wireless communication and communication equipment that includes the antenna unit.

BACKGROUND ART

Among pieces of communication equipment that perform wireless communication, some communication equipment includes a plurality of antennae in order to achieve compatibility with a plurality of standards or to enhance the communication quality. For example, communication equipment that includes both an antenna compatible with the Bluetooth (registered trademark) standard and another antenna compatible with a wireless local area network (LAN) standard is known. Further, in the multiple input multiple output (MIMO) technology, a plurality of antennae are used for one wireless communication connection.

SUMMARY

Technical Problems

In the communication equipment of the related art described above, in a case where a plurality of antennae transmit and receive radio waves in frequency bands overlapping with each other, mutual interference sometimes occurs between antennae and degrades the communication performance. In order to prevent such interference as just described to enhance isolation between antennae, it is conceivable to increase the physical distance between antennae. However, if the physical distance between antennae is increased, then this makes it necessary to increase the size of the communication equipment or gives rise to constraint in the structure. Especially, in a case in which it is desired to arrange antennae at positions spaced away from any other electronic part (a connector or the like) from a point of view of noise reduction or in a like case, it is sometimes difficult to arrange the antennae at positions spaced away from any other electronic part and arrange the antennae spaced away from each other.

The present invention has been made in view of such a situation as described above, and one of objects of the present invention resides in provision of an antenna unit and communication equipment that can suppress interference between antennae in a comparatively saved space.

Solution to Problems

An antenna unit according to one mode of the present invention includes a first antenna portion and a second antenna portion that individually transmit or receive a wireless signal, and a ground portion electrically connected to each of the first antenna portion and the second antenna portion and including a portion positioned between the first antenna portion and the second antenna portion. A through-hole that resonates with a given frequency is provided at a position of the ground portion between the first antenna portion and the second antenna portion.

Communication equipment according to one mode of the present invention includes an antenna unit including a first antenna portion and a second antenna portion that individually transmit or receive a wireless signal, and a ground portion electrically connected to each of the first antenna portion and the second antenna portion and including a portion positioned between the first antenna portion and the second antenna portion. A through-hole that resonates with a given frequency is provided at a position of the ground portion between the first antenna portion and the second antenna portion, and the communication equipment performs wireless communication with other communication equipment through the first antenna portion and the second antenna portion.

DESCRIPTION OF EMBODIMENT

In the following, an embodiment of the present invention is described in detail with reference to the drawings.

Figure 1:
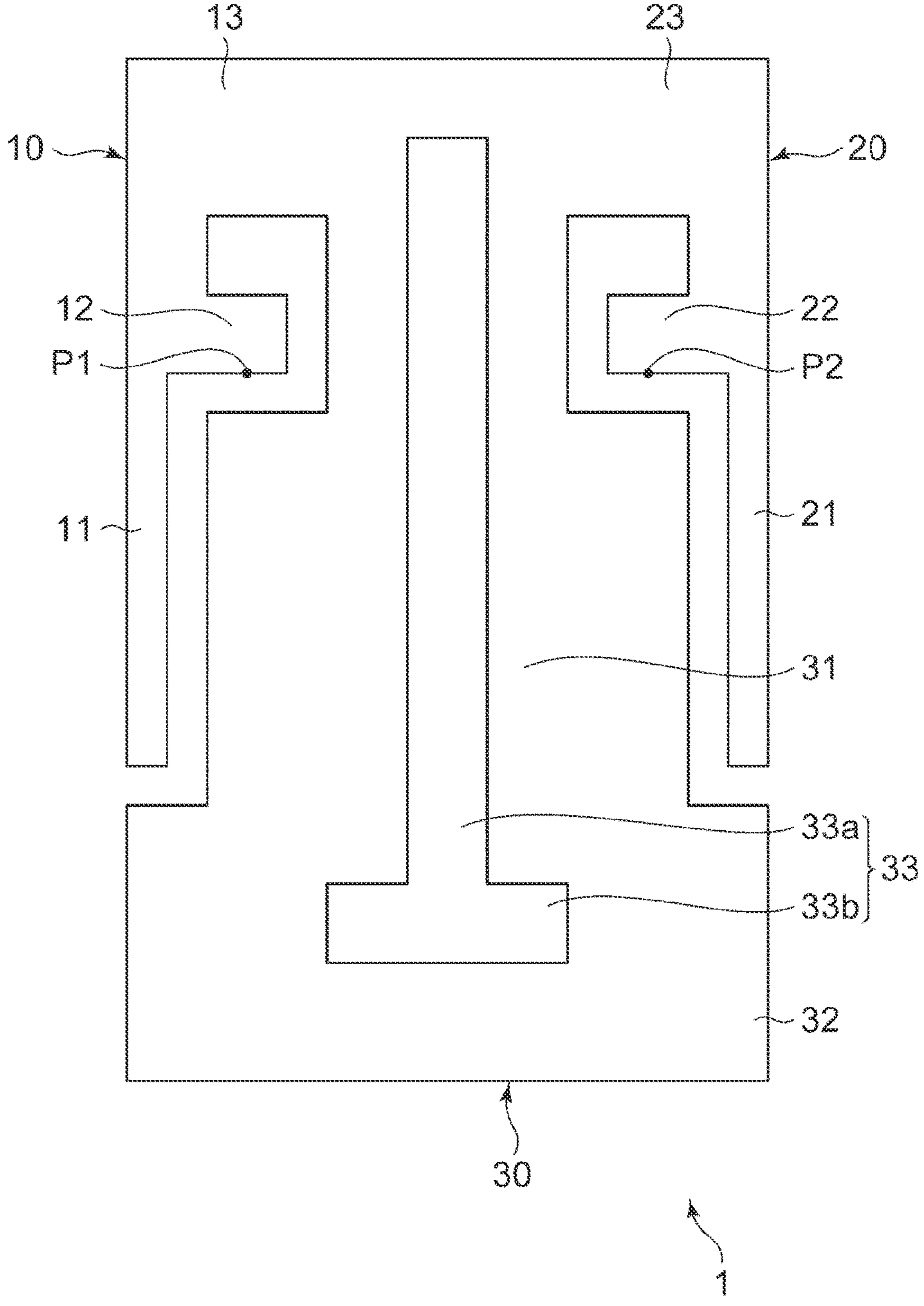
FIG. 1 is a top plan view depicting a shape of an antenna unit according to an embodiment of the present invention.

FIG. 1 is a top plan view depicting a shape of an antenna unit 1 according to the embodiment of the present invention. The antenna unit 1 is arranged in the inside of communication equipment according to the embodiment of the present invention. The communication equipment may be any of various types of equipment that perform wireless communication such as a personal computer, a stationary type game machine, a portable game machine, a smartphone, and a tablet, for example.

The antenna unit 1 is configured from a single conductor as a whole. More particularly, the antenna unit 1 is formed by processing a single metal member in the form of a plate. The antenna unit 1 includes a first antenna portion 10, a second antenna portion 20, and a ground portion 30. In the following description, the shape and the positional relation of the first antenna portion 10, the second antenna portion 20, and the ground portion 30 as viewed in top plan and functions of the components are described.

The first antenna portion 10 and the second antenna portion 20 individually transmit and/or receive a wireless signal (electromagnetic wave) independently of each other. The communication equipment according to the present embodiment performs wireless communication with some other communication equipment using the first antenna portion 10 and the second antenna portion 20. In the following description, the frequency band of a wireless signal to be used as a target of transmission and reception by each of the first antenna portion 10 and the second antenna portion 20 is referred to as target frequency band. It is assumed that the target frequency band of the first antenna portion 10 and the target frequency band of the second antenna portion 20 overlap at least partly with each other. For example, one of the first antenna portion 10 and the second antenna portion 20 may be used for wireless LAN communication based on the Institute of Electrical and Electronics Engineers (IEEE) 802.11 standard and the other one of the first and second antenna portions may be used for Bluetooth communication. Alternatively, both the first antenna portion 10 and the second antenna portion 20 may be used for communication by the same standard such as a wireless LAN or Bluetooth on the basis of a technology of the MIMO or the like. In the present embodiment, it is assumed that the target frequency bands of the first antenna portion 10 and the second antenna portion 20 substantially coincide with each other and are frequency bands in the proximity of 2.4 GHz.

The first antenna portion 10 has a substantially F shape as a whole and functions as an inverse F antenna. The shape and the size of the first antenna portion 10 are determined such that resonance occurs at a frequency of the target frequency band of the first antenna portion 10. In the following description, resonance occurring in the first antenna portion 10 is referred to as first resonance.

In particular, the first antenna portion 10 includes a main body portion 11, a feed portion 12, and a short-circuiting portion 13. The main body portion 11 is shaped such that it extends in an upward and downward direction and is connected at a base end thereof to a tip end of the short-circuiting portion 13, and the tip end of the main body portion 11 is an open end. The feed portion 12 is shaped such that it extends in a leftward and rightward direction and is arranged at a base end thereof a feed point P1 of the first antenna portion 10. The feed portion 12 is connected at a tip end thereof to the main body portion 11 at a position on the side near to the base end from between the tip end and the base end of the main body portion 11. The short-circuiting portion 13 is shaped such that it extends in the leftward and rightward direction so as to be in parallel to the feed portion 12 and is connected at a base end thereof to an upper end of the ground portion 30 and at a tip end thereof to the base end of the main body portion 11.

As depicted in FIG. 1, the second antenna portion 20 is arranged so as to be line-symmetric with the first antenna portion 10 with respect to the axis of symmetry given by a center line in the leftward and rightward direction of the antenna unit 1. In particular, the second antenna portion 20 has a shape substantially same as that of the first antenna portion 10 and is arranged in an orientation in which the first antenna portion 10 is reversed rightwardly and leftwardly. Further, the first antenna portion 10 and the second antenna portion 20 are arranged in a lined up relation so as to oppose to each other along the leftward and rightward direction of the antenna unit 1. Further, the first antenna portion 10 and the second antenna portion 20 are arranged at positions at substantially equal distances to each other from the center line in the leftward and rightward direction of the antenna unit 1. Further, as depicted in FIG. 1, a feed point P2 of the second antenna portion 20 is also arranged at a position line-symmetric with the feed point P1 of the first antenna portion 10 with respect to the axis of symmetry given by the center line in the leftward and rightward direction of the antenna unit 1. Consequently, the second antenna portion 20 resonates in the target frequency band substantially equal to that of the first antenna portion 10. In the following description, resonance occurring in the second antenna portion 20 is referred to as second resonance.

In particular, the second antenna portion 20 includes a main body portion 21, a feed portion 22, and a short-circuiting portion 23. The main body portion 21 is shaped such that it extends in the upward and downward direction and is connected at a base end thereof to a tip end of the short-circuiting portion 23, and the tip end of the main body portion 21 is an open end. The feed portion 22 is shaped such that it extends in the leftward and rightward direction, and the feed point P2 of the second antenna portion 20 is arranged at the base end of the feed portion 22. The feed portion 22 is connected at the tip end thereof to the main body portion 21 at a position on the side near to the base end from between the tip end and the base end of the main body portion 21. The short-circuiting portion 23 is shaped such that it extends in the leftward and rightward direction so as to be in parallel to the feed portion 22 and is connected at the base end thereof to an upper end of the ground portion 30 and at the tip end thereof to the base end of the main body portion 21.

As described above, the second antenna portion 20 is arranged so as to be line symmetric with the first antenna portion 10. Consequently, the directivities of the first antenna portion 10 and the second antenna portion 20 are also approximately left-right symmetric. Consequently, the correlation coefficient between the first antenna portion 10 and the second antenna portion 20 in the target frequency band can be suppressed low.

The ground portion 30 is electrically connected to the first antenna portion 10 and the second antenna portion 20 by being formed integrally with both of them and functions as the ground for the antennae. The ground portion 30 is shaped such that it extends in the upward and downward direction as a whole and is connected at an upper end thereof to the short-circuiting portion 13 of the first antenna portion 10 and the short-circuiting portion 23 of the second antenna portion 20.

More particularly, the ground portion 30 includes an intermediate portion 31 positioned between the first antenna portion 10 and the second antenna portion 20 and an outer edge portion 32 extending along a lower side of the antenna unit 1. It is to be noted that the ground portion 30 has a left-right symmetric shape with respect to a center line in the leftward and rightward direction of the antenna unit 1. Therefore, the entire antenna unit 1 is left-right symmetric with respect to the center line thereof.

A slot 33 is formed substantially in the middle of the ground portion 30 and is a through-hole extending through the antenna unit 1 in the form of a flat plate. The slot 33 is arranged at a position between the first antenna portion 10 and the second antenna portion 20. Specifically, in the present embodiment, the slot 33 is shaped such that it extends generally in the upward and downward direction (in other words, in a direction crossing with the direction in which the first antenna portion 10 and the second antenna portion 20 are lined up) along the center line in the leftward direction of the antenna unit 1 (in the direction in which the first antenna portion 10 and the second antenna portion 20 are lined up). Further, the slot 33 is arranged such that the distance from the slot 33 to the feed point P1 and the distance from the slot 33 to the feed point P2 are equal to each other. Further, the slot 33 is formed at a position at which it overlaps with part of a straight line interconnecting the feed point P1 of the first antenna portion 10 and the feed point P2 of the second antenna portion 20 as viewed in top plan.

The slot 33 includes an extension portion 33*a* of a substantially rectangular shape extending in the upward and downward direction and a wide portion 33*b* connected to one end of the extension portion 33*a* and having a width greater than that of the extension portion 33*a*. Consequently, the slot 33 has an inverted T shape as a whole. It is to be noted that the slot 33 is also left-right symmetric along the center line in the leftward and rightward direction of the antenna unit 1.

Due to the presence of the slot 33 that is hollow, resonance occurs not only at the first antenna portion 10 and the second antenna portion 20 but also in the ground portion 30 along the slot 33. In the following description, the resonance occurring along the slot 33 in the ground portion 30 is referred to as slot resonance. The frequency band of the slot resonance depends upon the length of the perimeter of the slot 33. In the present embodiment, the size and the shape of the slot 33 are determined such that the frequency band of the slot resonance overlaps with at least part of the target frequency bands of the first antenna portion 10 and the second antenna portion 20. In other words, the first resonance, the second resonance, and the slot resonance occur in the frequency bands that overlap with one another. In the following description, the frequency band common to the three resonances is referred to as resonance frequency band.

It is necessary for the perimeter of the slot 33 to have a length at least equal to or longer than a length corresponding to ½ the wavelength of an electromagnetic wave corresponding to the resonance frequency band. In order to secure this length of the perimeter, the wide portion 33*b* is formed at one end of the slot 33. It is to be noted that, in order to avoid interference with the first antenna portion 10 and the second antenna portion 20, the wide portion 33*b* is formed at one of the opposite ends of the slot 33 extending in the upward and downward direction, which is on the remote side from the feed points P1 and P2.

Further, the slot resonance in this resonance frequency band occurs in a phase displaced by 90 degrees from that of the first resonance. Therefore, the first resonance and the slot resonance have such a relation that the nodes and the bellies of them are swapped with each other. From such a relation as just described, the slot resonance acts as reverse resonance that cancels the influence of the first resonance upon the second antenna portion 20.

Figure 2A:
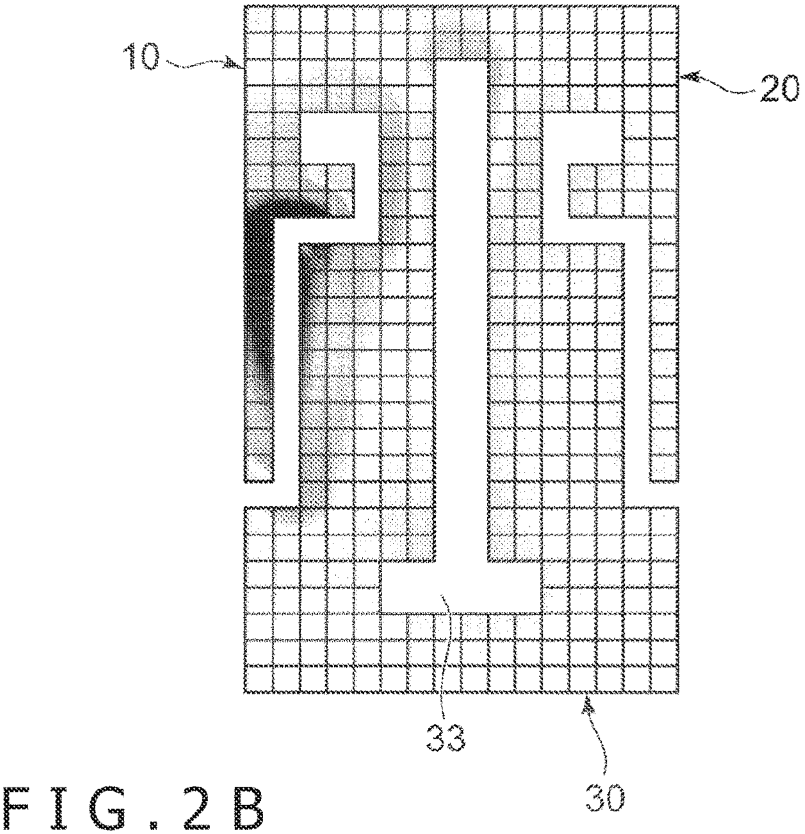
FIG. 2A is a view depicting a manner of resonance of the antenna unit according to the embodiment of the present invention.
Figure 2B:
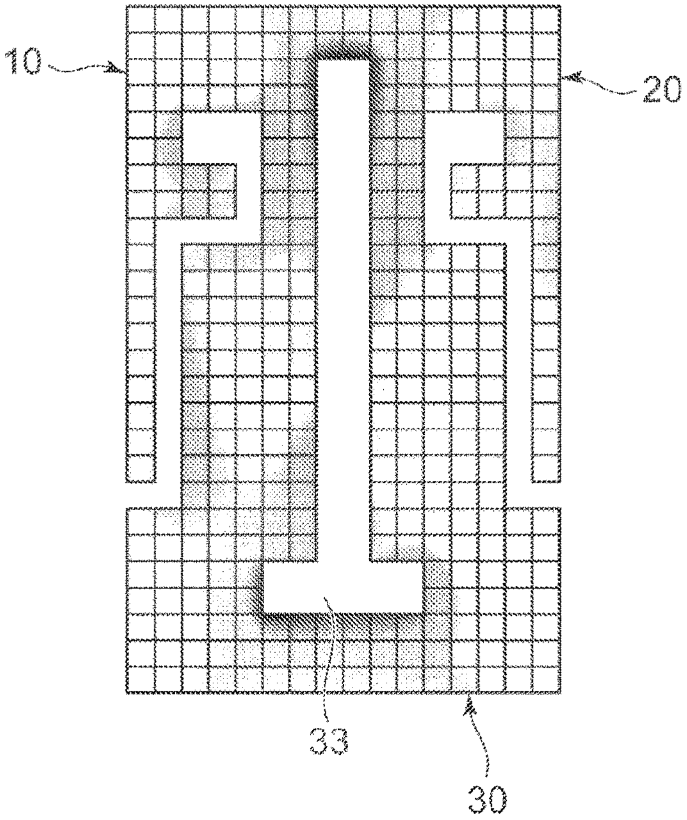
FIG. 2B is a view depicting another manner of resonance of the antenna unit according to the embodiment of the present invention.

FIGS. 2A and 2B are views depicting a relation between the first resonance and the slot resonance and indicate results of a simulation of an electric current distribution that appears when a signal is inputted to the feed point P1 of the first antenna portion 10. FIG. 2A depicts a current distribution generated by the first resonance, and FIG. 2B depicts an electric current distribution at a timing displaced by a phase of 90 degrees with respect to that of FIG. 2A. As depicted in FIGS. 2A and 2B, at a timing at which current by the first resonance is generated at the first antenna portion 10, significant current is not generated around the slot 33. Conversely, at another timing at which current by slot resonance is generated at the slot 33, significant current is not generated at the first antenna portion 10.

As described hereinabove, the slot 33 is arranged at a position just in the middle between the first antenna portion 10 and the second antenna portion 20 such that the distances of them to the two antennae become equal to each other. Therefore, the slot resonance is oscillation of a phase displaced by 90 degrees from that by the second resonance similarly to the first resonance described hereinabove. Consequently, the slot resonance acts as reverse resonance that cancels the influence of the second resonance upon the first antenna portion 10. In particular, in a case where a signal is inputted to the feed point P2, such electric current distributions that are left and right reversed from the electric current distributions depicted in FIGS. 2A and 2B occur.

Figure 3:
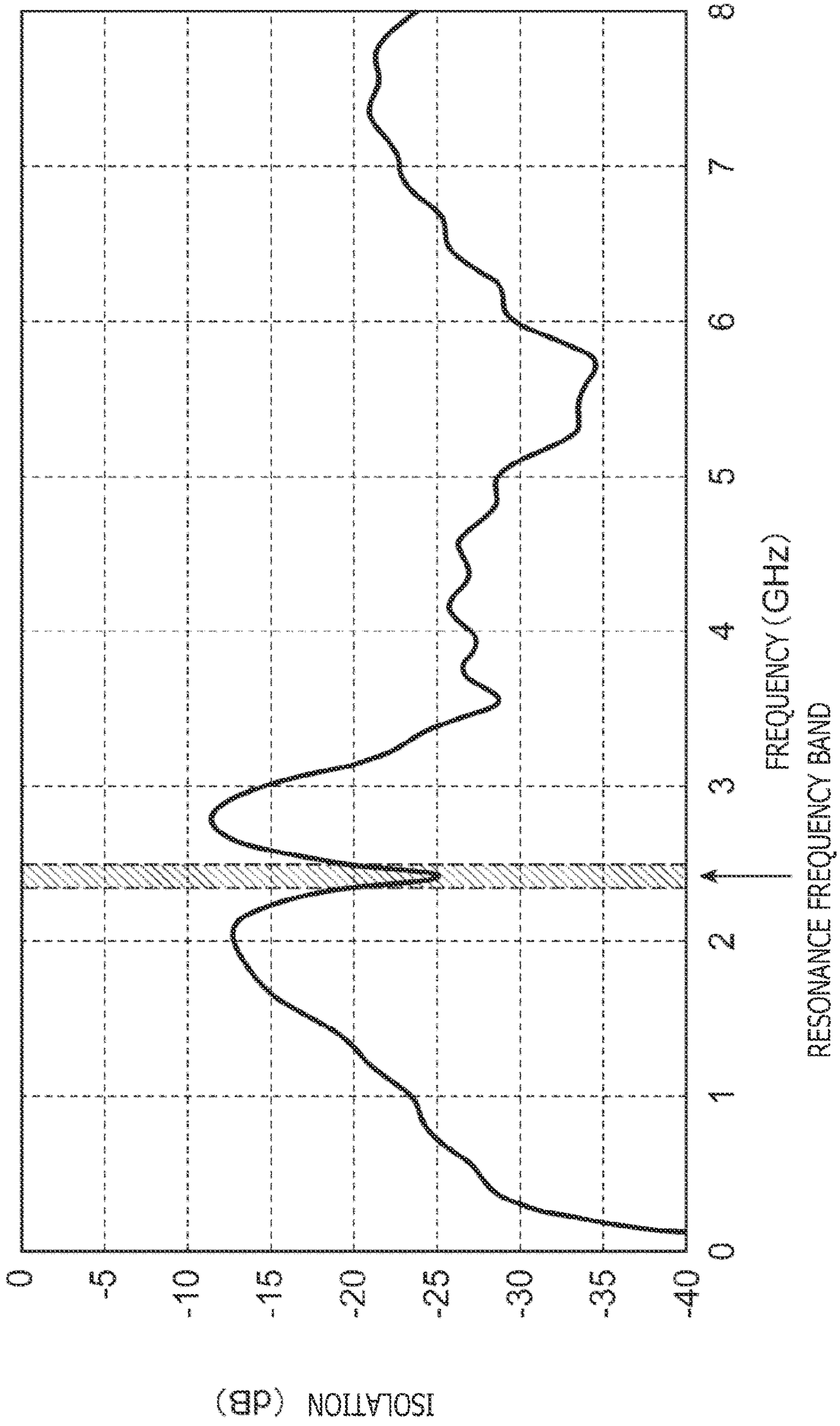
FIG. 3 is a view depicting an isolation performance between antennae in the antenna unit according to the embodiment of the present invention.

As described above, interference between the two antenna portions can be suppressed by slot resonance generated by the slot 33. FIG. 3 is a graph indicative of a result of research by simulation of the isolation performance between the antennae of the antenna unit 1 according to the present embodiment. The axis of abscissa of the graph indicates the frequency while the axis of ordinate indicates the value of isolation, and as the value decreases, the isolation performance between the antennae is improved. As depicted in this figure, it can be recognized that, according to the present embodiment, the isolation is improved in the resonance frequency band (frequency band in the proximity of 2.4 GHz).

With the antenna unit 1 according to the present embodiment described above, since the slot 33 generates resonance that is displaced by 90 degrees in phase from resonance generated by each antenna portion, the isolation performance between the two antenna portions can be improved without arranging the two antenna portions at positions spaced physically from each other. Further, with the antenna unit 1 according to the present embodiment, since the first antenna portion 10, the second antenna portion 20, and the ground portion 30 are formed as a unitary member from one conductive member, the structure is not complicated and the production cost can be suppressed.

It is to be noted that the embodiment of the present invention is not limited to that described above. For example, the shape of the antenna unit 1 in the foregoing description is nothing but an example, and the antenna unit 1 may have various shapes only if the ground portion 30 having the slot 33 therein is arranged between the first antenna portion 10 and the second antenna portion 20.

Figure 4:
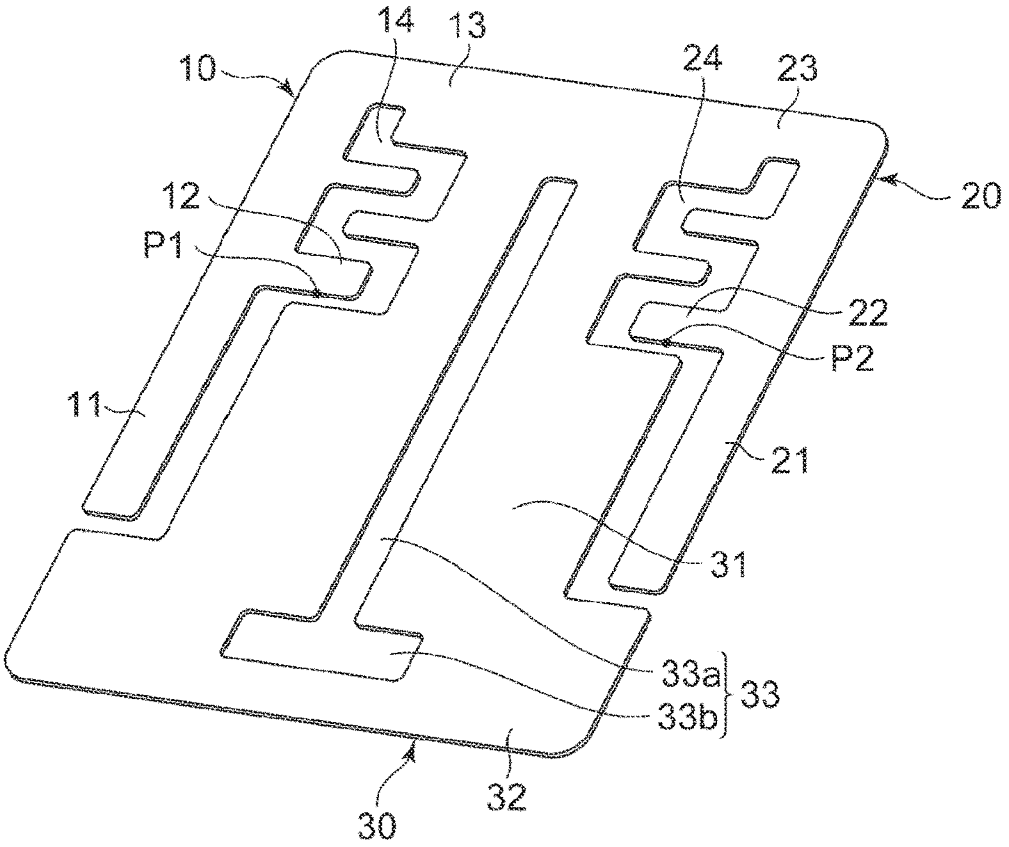
FIG. 4 is a perspective view depicting a shape of an antenna unit according to a first modification of the present invention.

In the following, several modifications of the antenna unit 1 are described. FIG. 4 is a perspective view depicting the shape of the antenna unit 1 according to a first modification. In the example of this figure, the first antenna portion 10 and the second antenna portion 20 are different in shape from those of FIG. 1, and consequently, the antenna unit 1 is configured such that it resonates in a plurality of frequency bands.

In particular, in the present modification, a slit 14 having a meandering shape is formed at a portion between the feed portion 12 and the short-circuiting portion 13 of the first antenna portion 10. By such a configuration as just described, the first antenna portion 10 generates resonance in a first target frequency band by means of the main body portion 11 and generates resonance in a second target frequency band by means of the slit 14. Consequently, the first antenna portion 10 transmits and receives a wireless signal in the two target frequency bands different from each other. The second antenna portion 20 has a left and right symmetrical structure to that of the first antenna portion 10, and consequently generates resonance in the first target frequency band by means of the main body portion 21 and resonance in the second target frequency band by means of the slit 24.

Also in the present modification, since the slot 33 generates slot resonance, the isolation performance between the first antenna portion 10 and the second antenna portion 20 can be improved. However, the slot 33 improves the isolation performance by generation of slot resonance targeting the resonance frequency band that depends upon the size and the shape of the slot 33. Therefore, it is preferable that the size and the shape of the slot 33 are determined according to a frequency band in which it is desired more to improve the isolation performance from between the first target frequency band and the second target frequency band.

Figure 5:
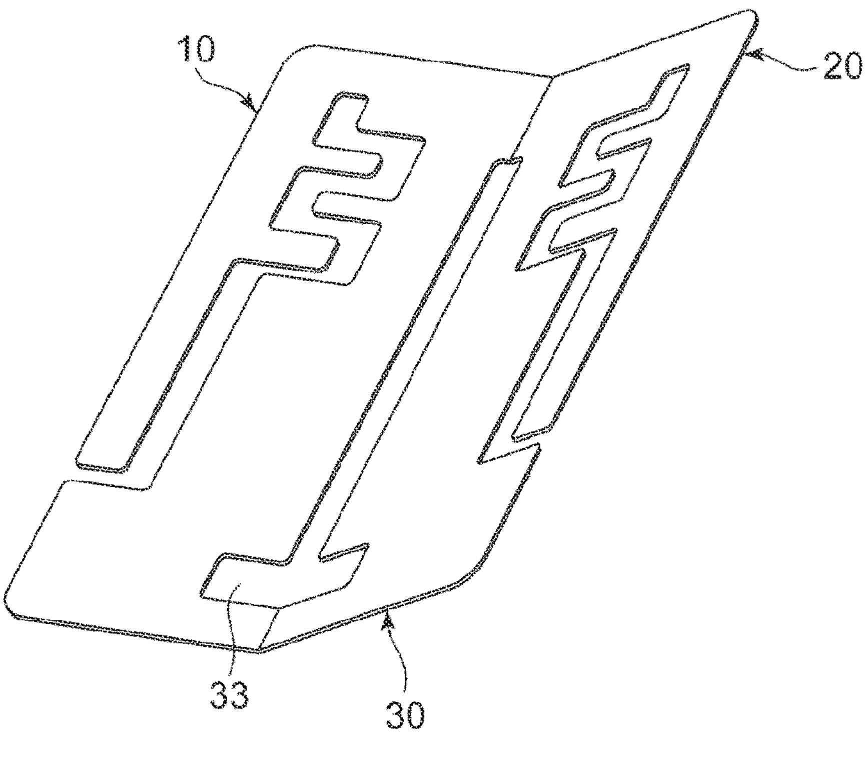
FIG. 5 is a perspective view depicting a shape of an antenna unit according to a second modification of the present invention.

In the description so far, it is assumed that the antenna unit 1 is formed from a metal member in the form of a flat plate and the first antenna portion 10, the second antenna portion 20, and the ground portion 30 are all included in the same plane. However, the shape of the antenna unit 1 is not limited to this. FIG. 5 depicts a shape of the antenna unit 1 according to a second modification. In the example of this figure, the antenna unit 1 is shaped such that a metal member of a shape same as that of the antenna unit 1 according to the first modification is bent to the inner side along a center line extending in the leftward and rightward direction thereof.

Figure 6:
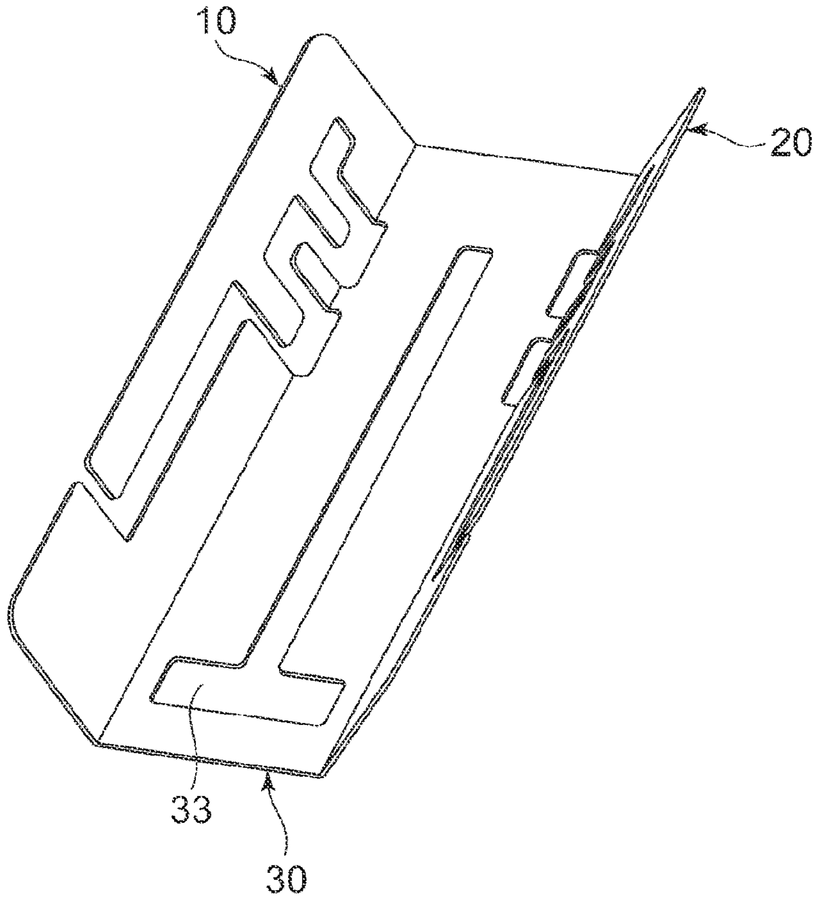
FIG. 6 is a perspective view depicting a shape of an antenna unit according to a third modification of the present invention.

Meanwhile, FIG. 6 depicts a shape of the antenna unit 1 according to a third modification. The antenna unit 1 according to the present modification is shaped such that it is bent to the inner side along a straight line extending in the upward and downward direction similarly as in the second modification. In particular, the antenna unit 1 according to the third modification is shaped such that a metal member in the form of a flat plate is bent along two straight lines including a straight line between the first antenna portion 10 and the slot 33 and another straight line between the second antenna portion 20 and the slot 33.

In this manner, the antenna unit 1 may not necessarily have a planar shape, and the isolation between the antennae can be improved only if the slot 33 for generating resonance of a phase displaced by 90 degrees from each of those of the first resonance and the second resonance is formed in the ground portion 30.

Further, although it is assumed in the foregoing description that the antenna unit 1 is formed from a single metal plate, the antenna unit 1 may otherwise be formed as a metal foil such as a copper foil on the surface of a printed board or the like. In this case, since a dielectric is arranged in the slot 33, the electric length of the perimeter of the slot 33 can be made greater than the physical length of the same. Therefore, the length of the perimeter of the slot 33 that resonates in a resonance frequency band can be made short in comparison with that in an alternative case in which the inside of it is hollow.

Further, although it is assumed in the foregoing description that the entire antenna unit 1 including the first antenna portion 10, the second antenna portion 20, and the ground portion 30 is formed from a single conductive member, the antenna unit 1 may be formed otherwise by connecting a plurality of conductive members. Further, in a case where the antenna unit 1 is formed on a printed board, it may be formed such that it extends across a plurality of printed board layers that are electrically connected to each other. Further, although it is assumed in the foregoing description that the first antenna portion 10 and the second antenna portion 20 have a fully same shape, the first antenna portion 10 and the second antenna portion 20 may have shapes different from each other corresponding to respective target frequency bands. Also in this case, by providing the slot 33 for generating resonance of a phase displaced by 90 degrees from those of the resonance of the first antenna portion 10 and the second antenna portion 20 at positions spaced by substantially equal distances from both the feed point P1 of the first antenna portion 10 and the feed point P2 of the second antenna portion 20, the isolation performance between the two antennae can be improved.

REFERENCE SIGNS LIST

1: Antenna unit
10: First antenna portion
20: Second antenna portion
11, 21: Main body portion
12, 22: Feed portion
13, 23: Short-circuiting portion
30: Ground portion
31: Intermediate portion
32: Outer edge portion
33: Slot
33*a*: Extension portion
33*b*: Wide portion

The invention claimed is:

1. An antenna unit comprising:
a first antenna portion having a first main body portion extending parallel to, and on a first side of, a reference axis and a first feed portion extending from the first main body portion transversely toward the reference axis, and operating to transmit and/or receive wireless signals;
a second antenna portion having a second main body portion extending parallel to, and on a second side of, the reference axis and a second feed portion extending from the second body portion transversely toward the reference axis, and operating to transmit and/or receive wireless signals; and
a ground portion electrically connected to each of the first antenna portion and the second antenna portion and including a portion positioned between the first antenna portion and the second antenna portion; and
a through-hole extending along the reference axis and positioned at the ground portion between the first antenna portion and the second antenna portion, such that the through-hole resonates at a through-hole frequency.

2. The antenna unit according to claim 1, wherein the through-hole is formed at a position overlapping with a portion of a straight line interconnecting a first feed point on the first feed portion of the first antenna portion and a second feed point on the second feed portion of the second antenna portion as viewed in top plan.

3. The antenna unit according to claim 1, wherein the through-hole is shaped so as to extend along the reference axis and at least as long as the first main body portion and the second main body portion.

4. The antenna unit according to claim 3, wherein one end of the through-hole has a width greater than that of the other portion.

5. The antenna unit according to claim 4, wherein one of opposite ends of the through-hole on a side remote from the first and second feed points of the first antenna portion and the second antenna portion has a width greater than that of the other portion.

6. The antenna unit according to claim 1, wherein the first antenna portion, the second antenna portion, and the ground portion are formed from a single conductive member in a form of a plate.

7. Communication equipment comprising:
an antenna unit including
a first antenna portion having a first main body portion extending parallel to, and on a first side of, a reference axis and a first feed portion extending from the first main body portion transversely toward the reference axis, and operating to transmit and/or receive wireless signals;
a second antenna portion having a second main body portion extending parallel to, and on a second side of, the reference axis and a second feed portion extending from the second body portion transversely toward the reference axis, and operating to transmit and/or receive wireless signals; and a ground portion electrically connected to each of the first antenna portion and the second antenna portion and including a portion positioned between the first antenna portion and the second antenna portion; and a through-hole extending along the reference axis and positioned at the ground portion between the first antenna portion and the second antenna portion, such that the through-hole resonates at a through-hole frequency, and the communication equipment performs wireless communication with other communication equipment through the first antenna portion and the second antenna portion.

8. The antenna unit according to claim 1, wherein:

the first antenna portion includes a first slit that forms at least one further extending portion extending from the first main body portion transversely toward and/or away from the reference axis, such that the first antenna portion operates to transmit and/or receive wireless signals in at least a first target frequency band and a second target frequency band; and the second antenna portion includes a second slit that forms at least one further extending portion extending from the second main body portion transversely toward and/or away from the reference axis, such that the second antenna portion operates to transmit and/or receive wireless signals in at least the first target frequency band and the second target frequency band.

9. The antenna unit according to claim 8, wherein a size and the shape of the through-hole are based on improving isolation between the first and second antenna portions at a selected one of the first target frequency band and the second target frequency band.

* * * * *